(12) United States Patent
Alvino et al.

(10) Patent No.: US 8,300,975 B2
(45) Date of Patent: Oct. 30, 2012

(54) PIECEWISE SMOOTH MUMFORD-SHAH ON AN ARBITRARY GRAPH

(75) Inventors: Christopher V. Alvino, Allenwood, NJ (US); Leo Grady, Yardley, PA (US)

(73) Assignee: Siemens Corporation, Iselin, NJ (US)

( * ) Notice: Subject to any disclaimer, the term of this patent is extended or adjusted under 35 U.S.C. 154(b) by 945 days.

(21) Appl. No.: 12/362,892

(22) Filed: Jan. 30, 2009

(65) Prior Publication Data
US 2009/0190833 A1    Jul. 30, 2009

Related U.S. Application Data

(60) Provisional application No. 61/024,625, filed on Jan. 30, 2008.

(51) Int. Cl.
*G06K 9/40*    (2006.01)
(52) U.S. Cl. ........ 382/266; 382/260; 382/274; 382/275; 358/3.26; 358/3.27; 358/463
(58) Field of Classification Search ............... 382/260, 382/274, 275, 266; 358/3.26, 3.27, 463
See application file for complete search history.

(56) References Cited

U.S. PATENT DOCUMENTS

| | | | |
|---|---|---|---|
| 6,586,735 B1 * | 7/2003 | Haking et al. | 250/307 |
| 6,891,966 B2 * | 5/2005 | Chen | 382/145 |
| 7,012,603 B2 * | 3/2006 | Chen et al. | 345/419 |
| 7,085,430 B2 * | 8/2006 | Winsor et al. | 382/275 |
| 7,236,622 B2 * | 6/2007 | Chen et al. | 382/132 |
| 7,296,238 B1 * | 11/2007 | Zurawski | 715/763 |
| 7,471,830 B2 * | 12/2008 | Lim et al. | 382/181 |
| 7,853,833 B1 * | 12/2010 | Gharbia et al. | 714/47.1 |

\* cited by examiner

*Primary Examiner* — Yosef Kassa
(74) *Attorney, Agent, or Firm* — Donald B. Paschburg; F. Chau & Associates, LLC

(57) ABSTRACT

A method for recovering a contour using combinatorial optimization includes receiving an input image, initializing functions for gradient f, smooth background g, and contour r, determining an optimum of the gradient f of a region R in the input image, extending the optimum of the gradient f of region R to a complement of R, determining an optimum of the smooth background function g for a region Q corresponding to the complement of R, extending the optimum of the smooth background function g of region Q to a complement of Q, and determining an optimum contour r according to the optimum of the gradient f and the optimum of the smooth background function g.

14 Claims, 4 Drawing Sheets

| | Initialization 1 | | | | Initialization 2 | | |
|---|---|---|---|---|---|---|---|
| | | iters. | sec./iter. | | | iters. | sec./iter. |
| | Level Set | 312 | 0.0061 | | Level Set | 1523 | 0.0073 |
| | Graph | 4 | 0.0616 | | Graph | 7 | 0.1176 |
| | Initialization 3 | | | | | | |
| | | iters. | sec./iter. | | | | |
| | Level Set | 1920 | 0.0101 | | | | |
| | Graph | 5 | 0.1187 | | Final segmentation | | |

FIG. 5

PIECEWISE SMOOTH MUMFORD-SHAH ON AN ARBITRARY GRAPH

BACKGROUND

1. Technical Field

The present disclosure relates to image analysis, and more particularly to machine learning, clustering and object segmentation within images.

2. Discussion of Related Art

The Mumford-Shah functional has had a major impact on a variety of image analysis problems including image segmentation and filtering and, despite being introduced over two decades ago, it is still in widespread use. Present day optimization of the Mumford-Shah functional is predominated by active contour methods. Unfortunately, these formulations necessitate optimization of the contour by evolving via gradient descent, which is known for its overdependence on initialization and the tendency to produce undesirable local minima.

The Mumford-Shah functional was devised to formulate the problem of finding piecewise smooth reconstructions of functions (e.g., images) as an optimization problem [1]. Optimizing the Mumford-Shah functional involves determining both a function and a contour across which smoothness is not penalized. Unfortunately, since smoothness of the reconstruction is not enforced across the contour and since the contour is variable in the optimization, the functional is not easily minimized using classical calculus of variations.

Given a fixed contour it is possible to solve for the optimal reconstruction function by solving an elliptic PDE with Neumann boundary conditions. Additionally, given a fixed piecewise smooth reconstruction function, it is possible to determine at each point on the contour, the direction and speed that the contour should move to decrease the functional as quickly as possible. Thus, most methods for solving the Mumford-Shah functional involve alternating optimization of the reconstruction function and the contour. The results of performing this style of optimization are well known and achieve satisfactory results that are usable for different imaging applications. Unfortunately, this optimization of the Mumford-Shah functional using contour evolution techniques (typically implemented with level sets) is slow primarily due to the small steps that the contour must take at each iteration. This slowness is exacerbated by the fact that a very small perturbation of the contour can have a relatively large effect on the optimal reconstruction function. Additionally, these traditional methods often require many implementation choices (e.g., implementation parameters) and the result of these choices may cause differences in the final result.

Although new functionals for segmentaton/filtering continue to be developed, the Mumford-Shah functional is still very widely used and optimized with level set methods. In addition to applications, recent work in the computer vision community has also continued to address theoretical aspects of the Mumford-Shah functional and its optimization.

Practical energy minimization problems formulated on a finite series of variables can often be solved efficiently using combinatorial (graph-based) algorithms. Furthermore, because of the well established equivalence between the standard operators of multidimensional calculus and certain combinatorial operators, it is possible to rewrite many PDEs formulated in RN equivalently on a cell complex (graph). By reformulating the conventional, continuous, PDE on a graph it becomes straightforward to apply the arsenal of combinatorial optimization techniques to efficiently solve these variational problems.

Therefore, a need exists for an improved method of determining a Mumford-Shah functional.

BRIEF SUMMARY

According to an embodiment of the present disclosure, a computer readable medium embodying instructions executable by a processor to perform a method for recovering a contour using combinatorial optimization, the method steps include receiving an input image, initializing functions for gradient f, smooth background g, and contour r, determining an optimum of the gradient f of a region R in the input image, extending the optimum of the gradient f of region R to a complement of R, determining an optimum of the smooth background function g for a region Q corresponding to the complement of R, extending the optimum of the smooth background function g of region Q to a complement of Q, and determining an optimum contour r according to the optimum of the gradient f and the optimum of the smooth background function g.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, a Mumford-Shah functional is formulated on an arbitrary graph with the application of combinatorial optimization to produce a fast, low-energy solution. In contrast to traditional optimization methods, use of these combinatorial techniques necessitates consideration of the reconstructed foreground image outside of the foreground region, requiring additionally the inclusion of regularization for generating these values. The energy of the solution provided by this graph formulation is compared with the energy of the solution computed via traditional narrow-band level set methods. This comparison demonstrates that our graph formulation and optimization produces lower energy solutions than the traditional gradient descent based contour evolution methods in significantly less time. Finally, we demonstrate the usefulness of the graph formulation to apply the Mumford-Shah functional to new applications such as point clustering and filtering of non-uniformly sampled images.

In this work, the Mumford-Shah functional is formulated on a graph in order to reap the benefits of combinatorial optimization to reduce the difficulties of speed and local minima associated with the small contour improvements obtained via traditional contour evolution. For example, an application of an exemplary Mumford-Shah functional according to an embodiment of the present disclosure can find a global optimum of a boundary update. Furthermore, applications of Mumford-Shah functional are enables for problems in: 3D mesh smoothing (e.g., for computer graphics); Machine learning; Data clustering; Segmentation/filtering of nonuniformly sampled images; etc. These applications of the Mumford-Shah functional are a direct consequence of the formulation and optimization approach described herein.

An additional benefit of reformulating an energy in a discrete, combinatorial setting is that such a generic formulation may be applied without modification to general data analysis problems, such as point clustering, mesh smoothing (segmentation) or space-variant vision. Even in the context of Cartesian image processing, recent work has examined modified neighborhood structures to generate improved segmentation results. An exemplary combinatorial formulation according to an embodiment of the present disclosure allows for a straightforward application of the Mumford-Shah optimization in these scenarios. For example, the popular NL-Means algorithm of may simply be interpreted as the addition of non-local neighborhoods (graph edges) to the graph with specific edge weights. This perspective on the NL-Means algorithm allows us to directly apply our combinatorial Mumford-Shah algorithm to the graph defined by the extra edges generated by NL-Means. In this manner, the graph construction and energy optimization may be separated and addressed independently. In Section III-B the use of the graph formulation is described to perform point clustering and to filter images defined on a space-variant data structure modeled after a biological sampling of image space.

According to an embodiment of the present disclosure, we instead present a complete combinatorial reformulation and solution of the more general piecewise smooth Mumford-Shah functional. Likewise, graph methods have also been employed in the minimization of total variation for image filtering tasks.

According to an embodiment of the present disclosure, the graph formulation that we pursue leads us to a combinatorial optimization approach that is capable of taking arbitrarily large steps of the contour location. In order to take these large steps, it is necessary for us to address the estimation of the foreground/background function values at locations (pixels) distant from the contour. To the knowledge of the authors, this work represents the first proposal for extending these foreground and background functions outside their region of evaluation.

According to an embodiment of the present disclosure, a discrete version of the Mumford-Shah is formulated, 2) a discrete version of the Mumford-Shah can be optimized efficiently using combinatorial optimization tools only if values of the reconstructed foreground intensities are extended beyond the foreground region, 3) these intensity values are extendable, 4) the resulting algorithm strongly outperforms existing level set optimizations of the Mumford-Shah functional, 5) the combinatorial formulation of the Mumford-Shah functional is applicable to nontraditional problems such as point clustering and nonuniform image processing.

Section I describes reformulating the Mumford-Shah functional on a graph and then showing how to perform the optimization using known combinatorial methods. In Section II several experiments are described to compare the combinatorial optimization associated with a graph formulation to the traditional level set implementation. The experiments focus on the relative speed of the two methods, as well as the convergence rate, robustness to initialization, robustness to parameter settings and the production of a lower-energy solution. In Section III-A the contour evolution produced via a combinatorial method is shown to be capable of non-local movement by taking arbitrarily large steps between iterations. Section III-B shows how to use a general formulation of the Mumford-Shah functional to analyze data on a non-lattice graph.

I. Method

In this section, an exemplary continuous piecewise smooth Mumford-Shah model is described. After this definition, each of the three terms is considered and a combinatorial analogue of the piecewise smooth Mumford-Shah functional is formulated. With these combinatorial analogues, it is shown how to perform an optimization of the variables.

A. Mumford-Shah Formulation: Continuous and Combinatorial

We begin by fixing our notation. A graph consists of a pair $G=(V,E)$ with vertices (nodes) $v \in V$ and edges $e \in E \subset V \times V$, with $N=|V|$ and $M=|E|$. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$ and is assumed here to be nonnegative. The degree of a vertex is $d_i = \Sigma w(e_{ij})$ for all edges $e_{ij}$ incident on $v_i$. The following will also assume that our graph is connected and undirected (i.e., $w_{ij}=w_{ji}$). An image may be associated with a graph by identifying each pixel with a node and defining an edge set to represent the local neighborhood relationship of the pixels (e.g., a 4-connected lattice).

Since the inception of the Mumford-Shah functional, there have been several related notions of what constitutes the Mumford-Shah functional. Consider the piecewise smooth model, formulated as $$E(f,g,R) = \alpha(\int_R (f-p)^2 + \int_{\Omega \setminus R} (g-p)^2) + \mu(\int_R \|\nabla f\|^2 + \int_{\Omega \setminus R} \|\nabla g\|^2) + \upsilon \Gamma(R), \quad (1)$$

where $\Omega$ represents the image domain, f represents the smooth foreground function, g is the smooth background function, R is the region of the image comprising the foreground, p is the pixel intensity, $\Gamma(R)$ is the length of the contour of region R, and $\alpha, \mu, \upsilon$ are free parameters. For ease of exposition, we assume that the image consists of grayscale values only, although the formulation could easily be extended to color or multispectral images. To simplify the parameter space (and notation) we assume that all three free parameters are strictly positive and divided by the value of $\mu$. Consequently, the inclusion of $\mu$ is omitted in the remaining exposition.

The formulation of (1) on a graph employs the combinatorial analogues of continuous differential operators. Although combinatorial representations of differential operations are established, the challenge in the graph reformulation of any particular energy (or PDE) is to associate variables in the continuous formulation with representative combinatorial structures (pixels, edges, cycles, etc.) and, as in the continuous case, to produce a useful representation of a "contour". Specifically, each integral may be considered as a pairing between a chain (domain of integration) and a cochain (function to be integrated). Associating each pixel in our image with a node in the graph, the integration over a collection of pixels (in set $S_R \subset V$) may be represented by the $N \times 1$ chain vector r, where $$r_i = \begin{cases} 1 & \text{if } v_i \in S, \\ 0 & \text{otherwise.} \end{cases} \quad (2)$$

The other two variables in E are cochains taking real values, i.e., $f_1 \in \mathbb{R}$, $g_1 \in \mathbb{R}$. Note also that the image I is treated as a vectorized, real-valued cochain existing on the nodes (pixels). Both chains and cochains will be treated as column vectors.

The first (data) term in (1) concerns quantities associated with pixels (i.e., intensities). We chose above to associate nodes with pixels, so p, f, and g must represent 0-cochains (functions mapping nodes to real numbers). This designation matches the continuous conception of these quantities as scalar fields. Since the data term in (1) integrates over a set of the domain for which p, f, and g are defined, r must represent a 0-chain indicating a region of the domain. Putting together the above observations, the analogue of the first term on a graph is $$E_1(f,g,r) = r^T(f-p)^2 + (1-r)^T(g-p)^2. \quad (3)$$

In order to formulate the second term, recall that the combinatorial analogue of the gradient operator is given by the node-edge incidence matrix $$A_{e_{ij}v_k} = \begin{cases} +1 & \text{if } i = k, \\ -1 & \text{if } j = k, \\ 0 & \text{otherwise,} \end{cases} \quad (4)$$

for every vertex $v_k$ and edge $e_{ij}$, where each $e_{ij}$ has been arbitrarily assigned an orientation. Consequently, we may write the gradient of f as the product Af. However, since gradients are vector functions (corresponding to cochains on edges in the combinatorial setting) and the integral in the second term is performed over a scalar function (i.e., the norm of the gradient at each point), we have to transfer the gradient cochain associated with edges back to a scalar cochain associated with nodes. Such an operator may be represented by the absolute value of the incidence matrix, although each edge is now double counted, requiring a factor of one-half. Specifically, the second term may be formulated as $$E_2(f, g, r) = \frac{1}{2}(r^T|A|^T(Af)^2 + (1-r)^T|A|^T(Ag)^2). \quad (5)$$

Finally, the contour length term may be formulated on a general graph by counting the number of edges spanning from R to $\overline{R}$, where $\overline{R}$ indicates the set complement of R. Such a measure may be represented in matrix form as $$E_3(f,g,r) = 1^T|Ar|. \quad (6)$$

If the graph is a standard 4-connected lattice (i.e., a 5-point stencil), then (6) produces the $l_1$ measure of the contour of region R. If the graph is viewed as embedded in $\mathbb{R}^N$, a Euclidean contour length may be measured using a suitably weighted graph (and corresponding incidence matrix) could be used in (6). For example, this construction may be used in term $E_3$. For purposes of generality and clarity here, the same A is used in all terms. All three terms may now be recomposed to define the combinatorial analogue of the piecewise smooth Mumford-Shah model, i.e., $$E(f, g, R) = \alpha(r^T(f-p)^2 + (1-r)^T(g-p)^2) + \\ \frac{1}{2}(r^T|A|^T(Af)^2 + (1-r)^T|A|^T(Ag)^2) + v1^T|Ar|. \quad (7)$$

Given the above definition of the combinatorial analogue of the Mumford-Shah functional, an optimization of the variables f, g and r is shown.

B. Optimization

An alternating optimization may be used, which treats the current contour, r, as fixed and then finds the optimal f and g. Given an f and g, the optimal r may then be found. We begin by considering the production of an optimal f and g from a fixed contour, r.

Before taking a partial derivative of (7) with respect to f, it is useful to rewrite the terms of (7) involving f in matrix form, $$E(f, R) = \alpha(f-p)^T \text{diag}(r)(f-p) + \frac{1}{2}f^T A^T \text{diag}(|A|r)Af. \quad (8)$$

Taking a partial derivative of (8) with respect to f yields $$\frac{\partial E}{\partial f} = 2\alpha \text{diag}(r)(f-p) + A^T \text{diag}(|A|r)Af. \quad (9)$$

The diag(.) operator represents the diagonal matrix formed by placing the argument vector along the diagonal. Since both the first and second terms of (8) are positive semi-definite, the zero of (9) represents a minimum of (8). Consequently, the optimal f given a contour satisfies $$(2\alpha \text{diag}(r) + A^T \text{diag}(|A|r)A)f = 2\alpha \text{diag}(r)p. \quad (10)$$

Consider the set $R^* = \{v_i | \text{ if } v_i \in R \text{ or } \exists e_{ij} \text{ s.t. } v_j \in R\}$ which includes all of the nodes in R as well as any nodes in $\overline{R}$ that are connected with an edge to R. From (10) it is clear that the nodes in the complement of $R^*$, $\overline{R}^*$, can take any value of f while satisfying (10). In other words, this part of f does not contribute to the energy in (7) and therefore may be ignored. Consequently, the optimum values of f in $R^*$ may be found by solving $$(2\alpha \text{diag}(r_{R^*}) + A_{R^*}^T \text{diag}(|A_{R^*}|r_{R^*})A_{R^*})f_{R^*} = 2\alpha \text{diag}(r_{R^*})p_{R^*}. \quad (11)$$

Note that since the energy computation in (7) reaches across the boundary by one pixel to produce the smoothness estimate, the optimum solution for f includes values at these pixels across the border. Since the system in (11) will generally force $x_i = x_j$ across the border separating $x_i$ and $x_j$, there will be no contribution to the energy in (7) from a gradient between these nodes. However, if any of the border nodes in $\overline{R}$ are connected to more than one node inside R (e.g., at a corner) then the solution in (11) will cause the border node to take the average value of the nodes inside R and this node will contribute to the energy in (7). This one-pixel reach across the boundary is a result of the combinatorial analogue of the gradient norm and is necessary to ensure optimizability of the energy in (7), but does not empirically contribute in any significant way to the energy of the final solution. The steps described above may be followed to find the solution for g. Specifically, define set $Q = \overline{R}$ and $Q^* = \{v_i | \text{ if } v_i \in Q \text{ or } \exists e_{ij} \text{ s.t. } v_j \in Q\}$, leading to a solution of $$(2\alpha \text{diag}(r_{Q^*}) + A_{Q^*}^T \text{diag}(|A_{Q^*}|r_{Q^*})A_{Q^*})g_{Q^*} = 2\alpha \text{diag}(r_{Q^*})p_{Q^*}. \quad (12)$$

We can now address the optimization of r, given a fixed f and g. Noting that all three terms of (7) are submodular linear functions of r, we can solve for r as a max-flow/min-cut computation. The reduction to a max-flow/min-cut computation may be more easily seen by writing the energy of (7) in traditional summation form as $$E(f, g, r) = \sum_{v_i} \left( r_i \left( \alpha(f_i - I_i)^2 + \frac{1}{2} \sum_{e_{ij}} (f_i - f_j)^2 \right) \right) + \sum_{v_i} \left( (1 - r_i) \left( \alpha(g_i - I_i)^2 + \frac{1}{2} \sum_{e_{ij}} (g_i - g_j)^2 \right) \right) + \nu \sum_{e_{ij}} |r_i - r_j|. \quad (13)$$

In effect, the first and second terms describe unary terms penalizing data infidelity from the reconstructed image and nonsmoothness in the reconstructed image. The contour length (third) term penalizes contour length and is written in terms of strictly positive weights, producing a submodular energy that may be optimized effectively with a max-flow/min-cut computation. Minimum cut computations on graphs representing images may be determined using the weighted graph (and corresponding incidence matrix).

Unfortunately, use of a max-flow/min-cut computation to optimize (13) requires knowledge of f and g in the entire domain. However, since the values in f outside of R* and the values in g outside of Q* make no contribution to the energy in (7) any solution for f and g in these regions may be used without affecting the energy. Consequently, some regularization is needed to assign these values by extending the known solutions for $f_{R^*}$ and $g_{Q^*}$, so that the optimization in (13) can be performed.

C. Extension of the Reconstructed Image

Outside of region R*, any values of f will satisfy (10). Consequently, this part of f does not contribute to the computation of the energy in (7) and could simply be ignored if the values were not needed to produce an optimal boundary location via minimization of (13). In fact, in the existing level set literature, the values of f outside region R are never considered, since an infinitesimal gradient step is being taken by the contour of the level set and values of f distant from the contour are inconsequential. However, in a combinatorial formulation, an optimal contour step may be used, regardless of the proximity of the new contour to the previous contour. Consequently, a meaningful f outside of region R* is needed. Although any choice of f outside of R* will have no impact on the energy, the solution for f within R is uniquely determined relative to any boundary. Therefore, the optimal f within R* may be determined by solving (11). This solution may be used to generate an f outside of R* that may be used as guidance for generating the next contour optimization.

It is assumed that f is a continuous function at the contour. Therefore, in order to enforce maximum smoothness between f inside R* and the extended f outside of R*, we propose to regularize the unknown part of f by constructing the f outside of region R* that satisfies the Laplace equation while treating the f inside of R* (obtained from (10)) as Dirichlet boundary conditions. The same procedure for extending g outside Q* is applied. Note, however, that other extensions of f and g are possible and may lead to improved performance.

Optimization of (13) using max-flow requires specification of values for the reconstructed foreground image function f in the region outside the foreground region R. Using a Laplace equation regularizer obtains the values for f and g for the entire image domain.

The Laplace equation may be solved on a general graph, given boundary conditions. The Laplacian matrix is defined as $$L_{ij} = \begin{cases} d_i & \text{if } i = j, \\ -w_{ij} & \text{if } v_i \text{ and } v_j \text{ are adjacent nodes}, \\ 0 & \text{otherwise}, \end{cases} \quad (14)$$

and that $L = A^T C A$, for some diagonal matrix C taking the edge weights along the diagonal. If we treat the solution to (11), $f_{R^*}$, as fixed Dirichlet boundary conditions, we can decompose the Laplacian matrix into $$\begin{bmatrix} L_{R^*} & B \\ B^T & L_{\overline{R^*}} \end{bmatrix}, \quad (15)$$

which allows us to solve the combinatorial Laplace equation by solving the system $$L_{\overline{R^*}} f_{\overline{R^*}} = -B^T f_{R^*}. \quad (16)$$

In summary, the optimum for $f_{R^*}$ and $f_{\overline{R^*}}$ may be produced by solving sparse, positive definite systems of linear equations for which many fast methods exist.

Following the same steps as above, the optimal $g_{\overline{Q^*}}$ is given by solving the linear system $$L_{\overline{Q^*}} g_{\overline{Q^*}} = -B^T g_{Q^*}. \quad (17)$$

In contrast to the standard continuous methods, at each iteration an exemplary method according to an embodiment of the present disclosure solve for a reconstructed image and contour that optimally minimize the Mumford-Shah energy, given a fixed contour (for the reconstruction computation) or a fixed reconstruction (for the contour computation). A consequence of these globally optimal steps is that all correct implementations will produce an equivalent answer. Since the same answer is produced regardless of implementation, there is no need to choose any implementation parameters. For example, any linear system solver run to convergence will produce the same answer to (11). Therefore, Gaussian elimination might be faster or slower than conjugate gradients, but both methods will produce the same answer if run to convergence and therefore there is no need to be concerned that implementation choices will have an effect on the quality of the final solution. Second, because a contour optimization is not performed via gradient descent, the contour update is capable of non-local movement to "snap" to the best contour, even if initialized far away. This non-local movement results in greater robustness to initialization, fewer iterations (translating to faster speed) and greater robustness to choices of weightings for the three terms in the Mumford-Shah functional. Additionally, as shown in Section IV-A, this non-local movement capability allows a graph formulation according to an embodiment of the present disclosure to jump over intervening structures of arbitrary size to find a low-energy solution to the Mumford-Shah functional.

Although a graph formulation according to an embodiment of the present disclosure produces optimal solutions for each alternating step of the Mumford-Shah minimization, there is no guarantee that a global optimum will be obtained for the joint energy. In fact, it is entirely unclear whether or not alternating global energy minimization steps will produce a lower joint energy than a series of small alternating local energy minimization steps. Therefore it is an empirical question to determine which optimization strategy produces a lower joint energy for real images. Both optimization strategies (graph and level set) are empirically tested in Section III against a battery of natural images to better understand which optimization strategy works best on the joint energy in practice.

D. Relationship to Graph Cuts

The Graph Cuts algorithm for image segmentation and denoising has been greatly extended since inception to where it is somewhat unclear what comprises "Graph Cuts". However, all algorithms under the title "Graph Cuts" seem to have the following qualities: 1) Defined on a (possibly directed) graph, 2) Using submodular edge weights to reflect likely contour locations, 3) Possibly including an intensity prior assigning each pixel to foreground/background, 4) Possibly including hard constraints (seeds) to force pixels to be foreground or background, 5) Optimization via a max-flow/min-cut computation, 6) Produces a global optimum of the desired energy.

With the above definition of the term "Graph Cuts", it is possible to observe that the contour optimization of (13) in the combinatorial formulation of the Mumford-Shah shares much in common. Specifically, in (13), intensity priors are present (from the data term), the weights are submodular and the optimum of (13) is obtained via a max-flow/min-cut computation. However, by examining the above list of ingredients for Graph Cuts, one may also notice differences with the combinatorial Mumford-Shah. First, the edge weights are not modified to reflect likely contour gradients. Second, in addition to the intensity priors, (13) involves an additional unary term penalizing the estimate of the normalized gradient near the pixel (obtained via the smoothness term in the Mumford-Shah functional). Third, no hard constraints (seeds) are imposed to constrain the foreground/background assignment of any pixels. Fourth, there is no reconstructed image variable (i.e., f, g) present in Graph Cuts. Finally, the solution of (13) is just one iteration in the overall optimization of the Mumford-Shah functional. Although the contour solution of (13) is optimal for each iteration, the overall energy minimization of the Mumford-Shah energy still produces a local minimum. It should be noted that certain extensions of the Graph Cuts work also utilize Graph Cuts as a subroutine while is re-estimating the intensity priors at each iteration. However, unlike the Mumford-Shah formulation, this work does not include a specific smoothness penalty term or a reconstructed image, hard constraints are included and the edges are weighted by image gradients. Additionally, it should be noted that we are not arguing that the Mumford-Shah functional is better or worse than these other energy minimization approaches, but rather that the Mumford-Shah model is still heavily applied and that the optimization is currently done using level sets. Given the traditional successes of applying a minimization of the Mumford-Shah energy and the recent successes of Graph Cuts (and its derivatives), it is not surprising that the algorithms bear a strong relationship.

FIGS. 1A-E and FIGS. 1F-J show a progression of a combinatorial formulation and optimization of the Mumford-Shah functional for recovering contours of a piecewise smooth image and reconstruction of the piecewise smooth approximation, respectfully. Contours (100) indicate contour location. FIGS. 1F-J show corresponding reconstruction of the piecewise smooth estimate of the image, given a contour (100).

E. Exemplary Method

Figure 1A:
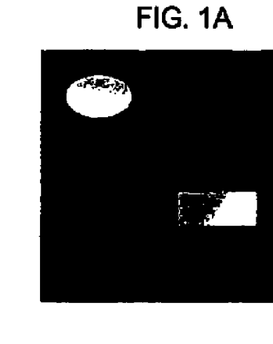
FIGS. 1A-E show a progression of Mumford-Shah functional according to an embodiment of the present disclosure for recovering contours.
Figure 1B:
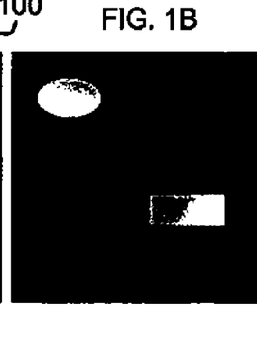
Figure 1C:
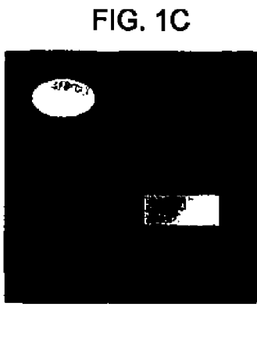
Figure 1D:
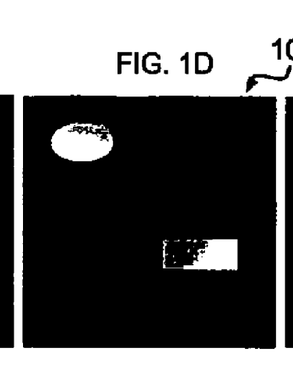
Figure 1E:
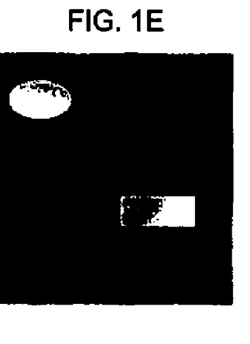
Figure 1F:
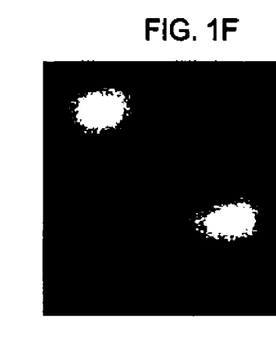
FIGS. 1F-J show a progression of Mumford-Shah functional according to an embodiment of the present disclosure for reconstruction of a piecewise smooth approximation.
Figure 1G:
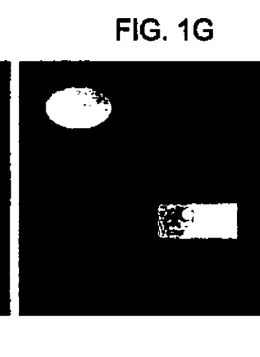
Figure 1H:
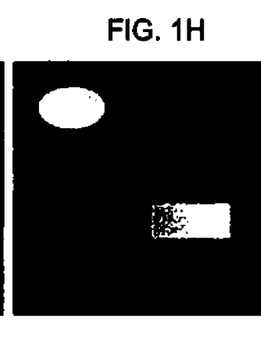
Figure 1I:
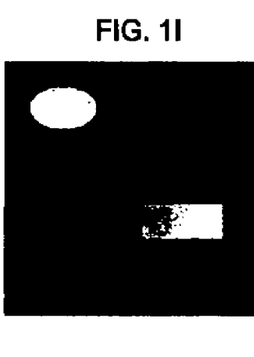
Figure 1J:
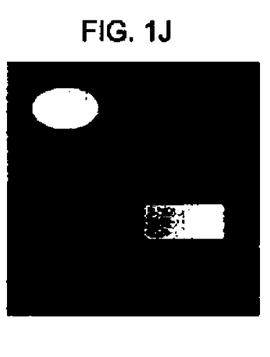
Figure 2:
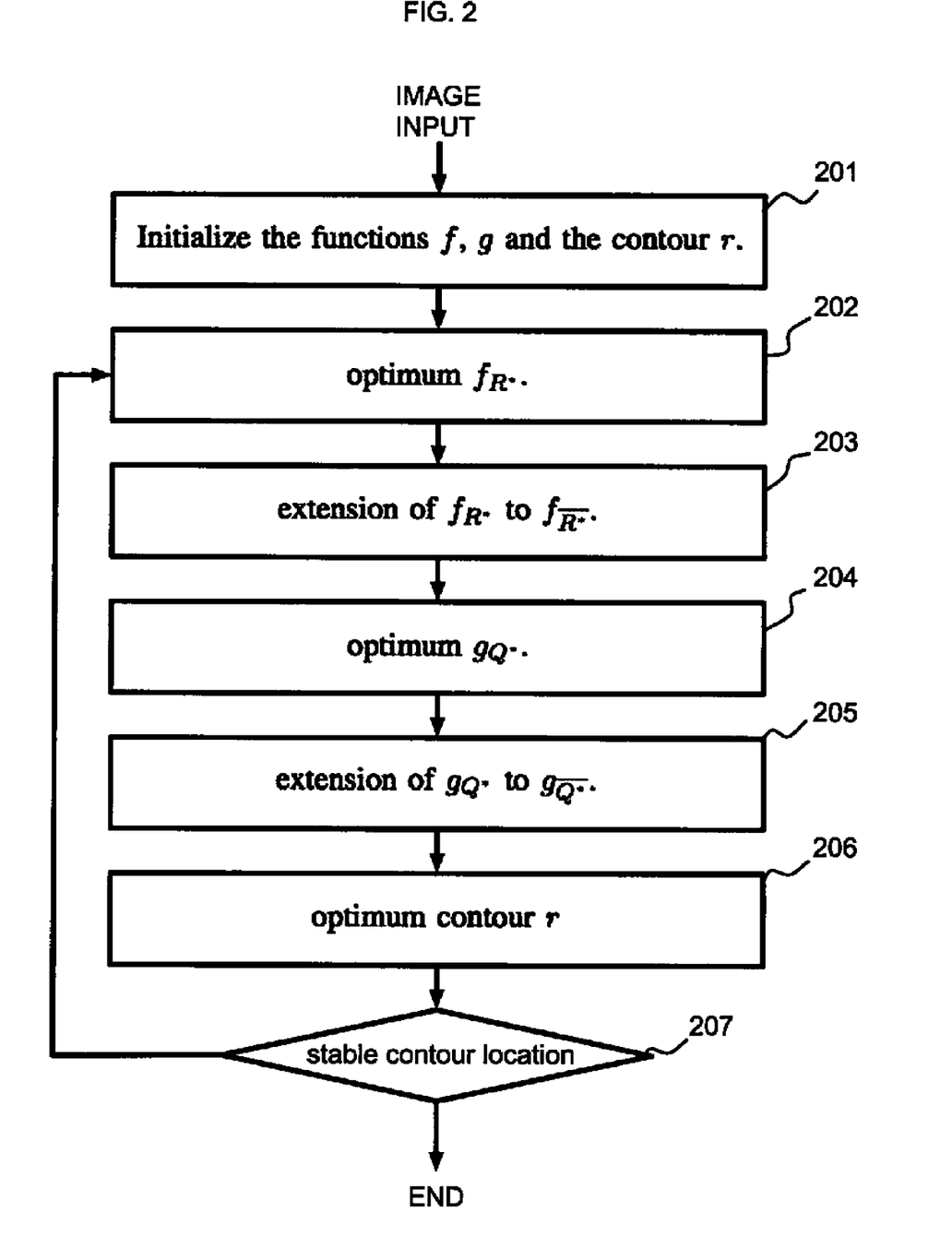
FIG. 2 is a flow chart of an exemplary method of formulating a Mumford-Shah functional according to an embodiment of the present disclosure.
Figure 3A:
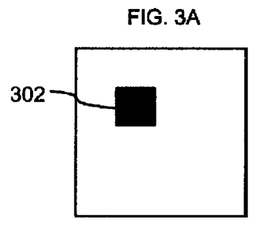
FIGS. 3-D are exemplary images showing contour evolution according to an embodiment of the present disclosure.
Figure 3B:
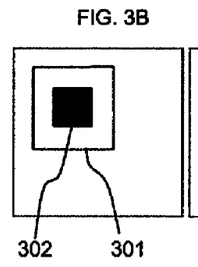
Figure 3C:
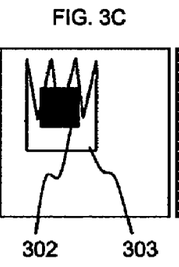
Figure 3D:
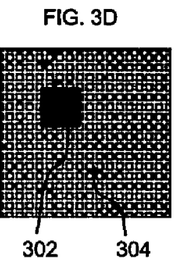

An exemplary combinatorial Mumford-Shah method initializes the functions f, g and the contour r (201), solves the linear system in (11) for the optimum $f_{R*}$ (202), solves the linear system in (16) for the extension of $f_{R*}$ to $f_{\overline{R*}}$ (203), solves the linear system in (12) for the optimum $g_{Q*}$ (204), solves the linear system in (17) for the extension of $g_{Q*}$ to $g_{\overline{Q*}}$ (205), solves the max-flow/min-cut problem in (13) for the optimum contour r (206), and repeats blocks (202-206) until the contour location remains constant (207).

Here, FIG. 2 may be modified for other applications, for example, for a data clustering application, block (206) may be modified for performing determining a neighborhood for every data point such that the output includes sets of data.

Traditional level set implementations of the Mumford-Shah functional are not required to perform blocks (203) and (205), since the extensions of f and g are not pertinent to a gradient descent method. Although the inclusion of blocks (203) and (205) are expected to double the computation of the function estimation step, the drastic reduction in the number of iterations observed with our graph formulation (see Section III) more than compensates for these additional computations.

The same steps apply to solving the Mumford-Shah functional in any dimension—The only difference between dimensions is in the underlying lattice employed (e.g., a 6-connected lattice compared to a 4-connected lattice).

A piecewise smooth approximation to the image is also obtained via the solution to f and g. Consequently, the exemplary method applies equally to image/signal denoising problems.

Due to the generality of the formulation, the same algorithm can be applied to the segmentation, clustering, denoising, etc. of any data defined on a graph. Examples of the application of this algorithm to the more general setting is given in Section IV-B.

Since global optima are obtained at each step, no implementation parameters (e.g., step size) are necessary in our graph formulation.

As a demonstration of correctness, FIG. 1 demonstrates that a combinatorial formulation and optimization appropriately segments a piecewise smooth image of size 256×256 pixels.

F. Convergence

It is of both theoretical and practical interest to know if the exemplary method above describing the minimization procedure for the Mumford-Shah actually converge. Fortunately, the procedure does converge because optimal steps are being taken to generate the reconstructed image and the contour location. The steps that involve solving for f and g, (11), (16), (12), (17), all provide unique solutions given a contour (due to the nonsingularity of the matrices in the equations). Consequently, every contour may be considered to be associated uniquely with a reconstructed image and the question of convergence can be applied only to the convergence of the contour location. Note that the solutions of $f_{\overline{R*}}$ and $g_{\overline{Q*}}$ that we proposed to estimate by solving a Laplace equation do not factor into the energy calculation and therefore the statements in this section apply to any alternative regularization procedure to estimate these hidden components of the reconstructed image.

The minimization of (13) for the contour location guarantees a minimum solution, but the solution is not necessarily unique. However, among all possible solutions for the contour location, each must have the same energy. Since the overall Mumford-Shah energy in (7) is non-negative, a lower bound exists and this bound is achieved by some contour location, since the collection of contours on a finite graph is finite (consisting of 2N possible labelings) and the optimal reconstruction associated with each contour is unique. Consequently, the only possibility for non-convergence would be if two contours (and consequent functions) were to produce the same energy and the algorithm were to oscillate between these contours. Such oscillation could be substantially prevented by halting the method if it visited the same contour more than once. In practice, observed oscillatory behavior has not been observed and consequently, have not had the need to employ such a device to guarantee convergence. Such an additional step may be implemented.

II. Results

The positives and negatives of Mumford-Shah segmentation and reconstruction have been well-discussed in the literature. According to an embodiment of the present disclosure, reformulation of the Mumford-Shah functional on a graph permits usage of the arsenal of combinatorial optimization methods to minimize the Mumford-Shah energy more quickly and to find lower-energy solutions. Consequently, the experiments described herein focus on answering the following questions about the relative merits of traditional level set implementations of the Mumford-Shah energy and the combinatorial optimization applied to an exemplary graph formulation of the Mumford-Shah functional according to an embodiment of the present disclosure:

1) Speed: Which procedure finds a solution with fewer iterations? What is the relative cost per iteration? What is the dependence of performance on resolution?

2) Initialization: Which procedure is more robust to initialization of the contour?

3) Parameters: Which procedure is more robust to the choice of parameter settings?

4) Energy minimization: Which procedure produces solutions with lower energy?

To answer the first three questions, a toy image of a black square on a white is background is used (see FIGS. 3A-D). Such a trivial image was chosen since 1) There is a clear energy minimum, 2) A relatively smooth energy landscape, 3) The same answer for a wide range of parameters, 4) A clear stopping criterion (i.e., when the contour matches the square). For these reasons, controlled experiments may be performed to probe the answers to the questions posed above about the relative performance of traditional contour evolution implementations (via level sets) and our new graph formulation of the Mumford-Shah energy. The last question regarding relative energy of the solutions is addressed by running both the graph and level set optimizations on a series of 50 natural images, comparing their resulting energies.

Comparing a combinatorial optimization of an exemplary graph formulation method according to an embodiment of the present disclosure with an efficient narrowband level set implementation of the continuous formulation. Great care was taken to ensure the correctness and efficiency of the level set implementation so that a fair and accurate comparison could be made between the two methods. The method employed alternating optimizations of the contour evolution and of the smooth functions as in the graph method and as has been used in all Mumford-Shah implementations of which we are aware. For efficiency, the level set function was computed and stored only in a narrow band around the contour, in which we maintained the sub-pixel position of the contour. Force extensions were computed on pixels which neighbored the contour. When computing the level set function update, the spatial derivatives associated with the curvature term were computed with central differences, and the spatial derivatives associated with the data terms were computed to ensure that the viscosity solution was obtained for the portion of the level set evolution that is a Hamilton-Jacobi equation. At each contour evolution step, an explicit forward-Euler scheme was updated in which the maximally stable time step was taken to ensure both stability and speed of the level set function evolution.

FIGS. 3A-D show a toy images used to compare the speed of traditional contour evolution implementation with proposed combinatorial optimization of the Mumford-Shah functional presented in this paper. The contours (100) indicate three different initializations used to generate results presented in Table I.

A widely available implementation of max-flow/min-cut was used. In order to produce a comparable comparison between the level set optimization and our graph framework in these 2D experiments, contour length of the cut was calculated with respect to a Euclidean measure in (6) by using the weighted incidence matrix of the graph with an approximation to the Euclidean distance represented by a neighborhood connected with a distance of two pixels.

A. Speed and Initialization

The first experiment examines the relative speed of traditional level set implementations and our new graph formulation for the box image using various image resolutions and contour initializations. In this experiment, three initializations were created—In FIGS. 3A-D a larger square (301) surrounding the target square (302), an erratic "crown"-shaped initialization (303) centered on the target square (302) and small squares (304) tiled throughout the image. For each of these initializations, we measured the number of iterations required to converge the level set and graph methods to the known optimum solution and the average time taken to produce one contour update for each method when run on an Intel Xeon 2.40 GHz processor with 1 GB of RAM. The time per iteration and time for a boundary update may not be multiplied directly to produce a total execution time since each method additionally requires an image reconstruction update. However, this function update is computed in roughly the same manner (assuming a finite differences discretization in the level set method) for both algorithms, although our combinatorial method requires twice as much time for the function update since the level set method does not require that the foreground/background functions be extended. If the function computations are much larger than the boundary updates then the relative execution times will be close the to ratio of iterations. However, if the function computations are much less than the boundary updates, then the relative execution times will be close to the ratio of the number of iterations for each method multiplied by the boundary update time for each method. Since the linear system solver is not different for these two methods (on a Cartesian grid), we simply report both the total number of iterations and the boundary update time.

TABLE I

Results of experiment comparing speed of convergence for level set (LS) solver and our graph (GR) formulation.

| Initialization/ Resolution | LS iterations | LS mean iter. time | GR iterations | GR mean iter. time |
| --- | --- | --- | --- | --- |
| Box (64 × 64) | 41 | 0.002 s | 2 | 0.0064 s |
| Box (128 × 128) | 126 | 0.0057 s | 2 | 0.0211 s |
| Box (256 × 256) | 140 | 0.0199 s | 2 | 0.0838 s |
| Crown (64 × 64) | 262 | 0.0023 s | 4 | 0.0091 s |
| Crown (128 × 128) | 1393 | 0.0061 s | 3 | 0.0239 s |
| Crown (256 × 256) | 110 | 0.0245 s | 4 | 0.1019 s |

TABLE I-continued

Results of experiment comparing speed of convergence for
level set (LS) solver and our graph (GR) formulation.

| Initialization/<br>Resolution | LS<br>iterations | LS mean<br>iter. time | GR<br>iterations | GR mean<br>iter. time |
|---|---|---|---|---|
| Squares (64 × 64) | 294 | 0.0072 s | 3 | 0.0094 s |
| Squares (128 × 128) | 940 | 0.0112 s | 3 | 0.0295 s |
| Square (256 × 256) | 540 | 0.0624 s | 3 | 0.1177 s |

Note:
1) The parameter settings were chosen to best favor the level set method in every experiment,
2) Exactly the same initializations were given to both algorithms,
3) The size and spacing of the squares initialization was chosen to favor the LS method. Time reported "per iteration" refers to update of the contour location, since computation of the reconstructed image is the same in both methods (although this computation is effectively doubled for GR since the inside/outside functions are extended beyond their respective region).
Note that while the displayed number of level set iterations may seem particularly high, It is important to note that the initializations in these cases are very distant from the desired contour.

Figure 4:
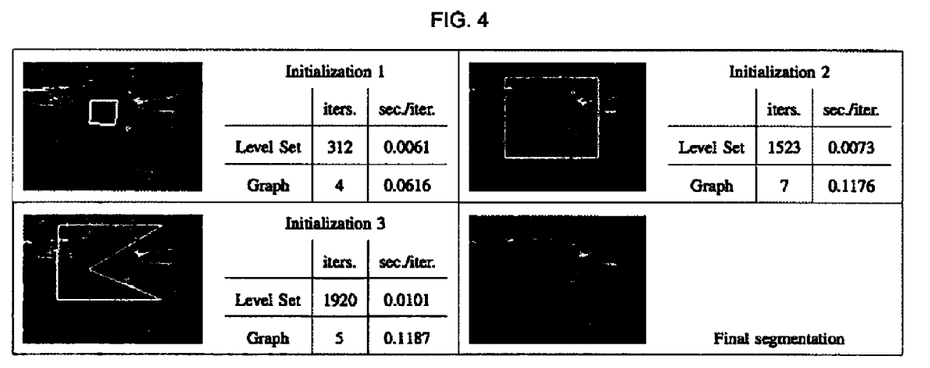
FIG. 4 illustrates a comparison of a number of iterations and speed of iteration for different initializations on a given image according to an embodiment of the present disclosure.

FIG. 4 illustrates a comparison of number of iterations and speed of iteration for different initializations on ultrasound image. Parameters were chosen to best benefit the level set method.

In this experiment, the parameters in the energy functional were chosen to favor the level set method as much as possible, as determined via manual adjustment. Table I displays the results of this experiment. The time reported "per iteration" in this table refers to the update of the contour location, since the computation of the reconstructed image is the same in both methods (although this computation is effectively doubled in our graph method since the inside/outside functions need to be extended beyond their region). Therefore, even though each iteration of our graph method is slightly more expensive than an iteration of the level set method, the improvement of 1-3 orders of magnitude in the number of iterations causes the total runtime of the graph method to be much less than that of the level set method. Additionally, the graph method converges within 2-4 iterations regardless of the resolution, initialization or parameters. Note that while the displayed number of level set iterations may seem particularly high, it is important to note that the initializations in these cases are very distant from the final contour.

These experiments suggest that the combinatorial optimization of the Mumford-Shah functional produces the correct solution much faster than the traditional level set optimization, regardless of the resolution or contour initialization. Indeed, the parameters were chosen to favor the level set method. Choosing the parameters to favor our proposed graph method would have resulted in a stronger disparity in favor of the graph method. In the next section, we detail the results of an experiment intended to measure the robustness of the two approaches to parameter choice.

A third experiment was performed on a real ultrasound image in the same manner as the first. An initialization was introduced inside the target object, outside the object and then erratically inside and outside the object. The results in terms of number of iterations and speed of each iteration are shown in FIG. 4 and correspond well with the results from our synthetic experiment. Once again, the parameters of the terms in the Mumford-Shah energy were chosen to best favor the level set method and both methods converged to roughly the same contour.

TABLE II

Comparison of robustness to the three term parameters in (1).
Using the (128 × 128) toy image above with the "box"
initialization, for 50 trials we randomly chose the three term
parameters from independent uniform distributions on the interval
(0, 1) and ran both the level set and combinatorial
optimizations of the MSF. A randomly generated set of
parameters was rejected and re-run if the target square was not
the minimum of the MSF. In all cases, combinatorial optimization
produced the target square in two iterations, regardless
of parameters.

| Optimization<br>algorithm | Mean iterations | Median iterations | Iteration number<br>standard deviation |
|---|---|---|---|
| Level set | 1614.40 | 1520 | 391.80 |
| Graph | 2 | 2 | 0 |

Note that the number of iterations reported for the level set method in Table I was much less than the averages reported here due to the fact that all of the results reported in I used parameters that were hand-selected to favor the level set convergence.

B. Parameter Robustness

The choices of the term parameters in (1) can make drastic differences in the optimal contour and reconstruction produced by minimizing the Mumford-Shah functional. Even if the optimal contour and reconstruction are the same for different choices of parameters, the parameter choices could affect the speed of convergence for a given initialization. In this experiment, we examine the robustness of both the level set and graph formulations of the Mumford-Shah energy to the choice of parameters in terms of the number of iterations needed to reach the optimum solution. Once again, we employ the toy example of FIGS. 3A-D. For this experiment, a most simple "box" was used in the initialization of FIGS. 3A-D since it is expected that both algorithms will reach the target contour for all parameter choices. Fifty iterations in which the parameters for each of the three terms of (1) were chosen independently from a uniform distribution within the interval of zero to one and then both the level set and graph algorithms were applied to minimize the Mumford-Shah energy. If the target square was not the optimum solution for the randomly generated parameters, this parameter set was rejected and the trial re-run. After each parameter set, the number of iterations and average time per iteration were recorded.

The results of this experiment are displayed in Table II. We see that the rate of convergence of the level set method is highly dependent on the parameters, while the rate of convergence for the graph method is completely independent of the parameter set. Both algorithms exhibited independence of the per iteration time on the parameter set. Empirically, the results of this experiment concur with our experience that the convergence rate, and solution achieved, of the graph method is much less sensitive to the parameter settings than the level set method. Note that the number of iterations reported for the level set method in Table I was much less than the average reported in Table II due to the fact that all of the results reported in Table I used parameters that were hand-selected to favor the level set convergence.

Beyond speed, combinatorial optimization techniques for solving the Mumford-Shah functional produce solutions with a lower energy than the solutions obtained by conventional level set techniques. In order to compare solutions in terms of minimal energy, we must address natural images for which the energy landscape is nontrivial. Both the graph-based and level set algorithms were applied to natural images using the same initialization/parameters to empirically compare the Mumford-Shah energies obtained by the final solutions.

This experiment was performed on 50 different natural images, of which 11 were from the Berkeley image database, 12 were miscellaneous photographs, and 27 were various medical images (12 ultrasound, 4 CT, 5 MRI, 3 digital microscopy, 1 fMRI, and 2 angiography images). For each image, initializations and parameters were selected to produce a contour (for at least one algorithm) that was semantically meaningful. Cluster plots of the final graph MS energy vs. the final level set MS energy are shown in FIGS. 5A-B for these 50 images. In most cases, optimization of our graph formulation of the Mumford-Shah functional produced solutions with an equal or lower energy and sometimes produced solutions with dramatically lower energy. In a few cases, the level set formulation produced slightly lower energy.

III. Additional Capabilities of the Formulation

In this section, two desirable aspects of an exemplary combinatorial formulation are described. First, the ability of a graph formulation to exhibit non-local movement is demonstrated, since the optimal contour is found at each iteration, there is no limitation that the contour move to a nearby location. Consequently, the segmentation may be found faster (by taking larger steps) but, the formulation also permits the contour to "jump over" spatial obstacles that would prevent the contour from finding a low energy. Further, an example is provided for how an exemplary combinatorial formulation permits the application of Mumford-Shah methods to data associated with an abstract graph. Specifically, a Mumford-Shah functional according to an embodiment of the present disclosure may be used to perform filtering (piecewise reconstruction) of image data defined on a space-variant data structure intended to model the sampling scheme of the human retina and on a point clustering problem.

A. Non-Local Movement

An advantage of the contour optimization in a graph reformulation according to an embodiment of the present disclosure of the Mumford-Shah energy is that it enables movement to the optimal location at each iteration. For this reason, an exemplary method according to an embodiment of the present disclosure is able to move to arbitrary image locations as predicted by the solution to (13) depending on the current estimate of the piecewise smooth reconstructions. The motion of the contour is thus not limited to local movements as are traditional optimizations of the contour by gradient descent.

The piecewise smooth MSF may drive non-local movement via insufficient smoothness, permitting the penetration of an annulus with a center comprised of pure noise.

In the millstone image, we are able to achieve correct segmentation of the inner ring instantly. We would like to draw attention to the method by which Chan and Vese were able to determine inner boundaries of objects. The ability to segment this inner boundary was due to the mollified Heaviside function that was used to approximate a region indicator function. Indeed, one could argue that there always exists some heavy-tailed mollified Delta function that could achieve the segmentation of the inner ring for an annulus of fixed thickness. However, such heavy-tailed Delta functions ultimately sacrifice segmentation accuracy and thus, one must modify the mollification kernel during the optimization if high accuracy is desired. Such an implementation trick is completely obviated by using our proposed method which works for annuli of arbitrary thickness with no such temporary sacrifice in accuracy.

Distant (non-overlapping) initializations are not a problem for the combinatorial method as they are for methods that evolve the contour via gradient descent. Such a poor initialization could occur via automatic initialization of outlier image data. Regardless of the distance of the object to the initialized contour, an exemplary contour optimization is able to find such salient object boundaries.

Due to the minimization procedure, the proposed combinatorial formulation progresses the contour in ways that are optimal at each iteration. If non-local movement is considered undesirable for some segmentation tasks (e.g., perhaps the outside of the annulus is the target segmentation), it is possible to restrict the movement of the contour to a fixed distance from the present contour. This restriction may be accomplished by fixing the r values in the contour optimization that are more than a predetermined distance, $\rho$, from the present contour. Using this device, the contour would not change its location past $\rho$ pixels of its location at the previous iteration.

It should be noted that the notion of "non-local movement" discussed herein means the ability to make large jumps in space. A method according to an embodiment of the present disclosure seeks to minimize the energy using an entirely different scheme than gradient descent.

B. Mumford-Shah on a General Graph

Image processing techniques are typically applied to Cartesian-sampled images in 2D or 3D with a local neighborhood structure. However, may other kinds of data exist in which the same tasks of clustering (i.e., segmentation) or filtering are important. In order to apply a combinatorial formulation of the Mumford-Shah function, all that is needed is to have a series of finite data points for which it is possible to define a neighborhood relationship (edge set) and such that each data point has an associated value (or vector of values). Therefore, by formulating the Mumford-Shah functional on a general graph, an exemplary algorithm has application to clustering points in a feature space or mesh smoothing and segmentation.

In this section, two different application areas are described for demonstrating an exemplary formulation of the Mumford-Shah energy. The first exemplary application is to a piecewise smooth reconstruction of a nonuniformly sampled image and the second exemplary application is to point clustering.

Non-uniformly sampled images may occur in applications due to the image acquisition device (e.g., ultrasound). Additionally, such sampling of images has also been heavily studied because of the connection to the sampling of biological retinas. These biological retinas may exhibit a wide range of sampling, but the primate sampling structure may be described as consisting of a foveal pit of high density sampling in the center of visual space with an exponential reduction in sampling toward the periphery. Using the idealized sampling of the human retina provided in the free Graph Analysis Toolbox, a standard Cartesian image was imparted to this foveal structure and optimized the Mumford-Shah functional to produce a piecewise-smooth reconstruction of the data. Note that the only change needed to employ this foveal structure was to change the node and edge set of the graph to match the non-uniformly sampled image (given by the Graph Analysis Toolbox, in this case), which then provides a new A operator. Given this A operator, the exemplary procedure in Section II-E may be applied as described to produce the minimum of the combinatorial formulation of the Mumford-Shah energy.

An exemplary combinatorial formulation of the Mumford-Shah energy applies not only to image data, but to any function assigning values to the graph nodes (a 0-cochain). Consequently, the coordinates in feature space of a clustering problem may be taken and an exemplary method according to an embodiment of the present disclosure applied to perform the clustering. The foreground/background coordinates may be used as independent scalar functions, which may be thought of as adding a second set of data/smoothness terms into (7). Note that this problem is intended to demonstrate the generality of our formulation rather than the difficulty of this particular clustering problem.

Experiments indicate a dramatic improvement of an exemplary graph-formulated optimization over traditional contour evolution approaches. This improvement is in terms of speed, robustness to initialization, robustness to parameter settings and in the production of a solution representing a lower Mumford-Shah energy. Additionally, combinatorial optimization techniques (not based on gradient descent) are used to solve an exemplary graph formulation of the Mumford-Shah functional, which permits non-local movement of the contour to find low energy solutions.

Although the measured comparisons with the traditional level set method were performed in 2D, an exemplary formulation may be applied equally to 3D lattices. Additionally, in strong contrast to traditional methods of formulation and optimization of the Mumford-Shah functional, an exemplary method according to an embodiment of the present disclosure permits application on arbitrary graph structures, including non-uniformly sampled images.

Furthermore, multiple labels may be applied in the contour computation to address triple points and other junctions for which hierarchical methods and multiphase level sets have been employed. Other regularization choices for extending the f and g reconstructions beyond their region of calculation may be selected.

It is to be understood that embodiments of the present disclosure may be implemented in various forms of hardware, software, firmware, special purpose processors, or a combination thereof. In one embodiment, a software application program is tangibly embodied on a program storage device. The application program may be uploaded to, and executed by, a machine comprising any suitable architecture.

Figure 5:
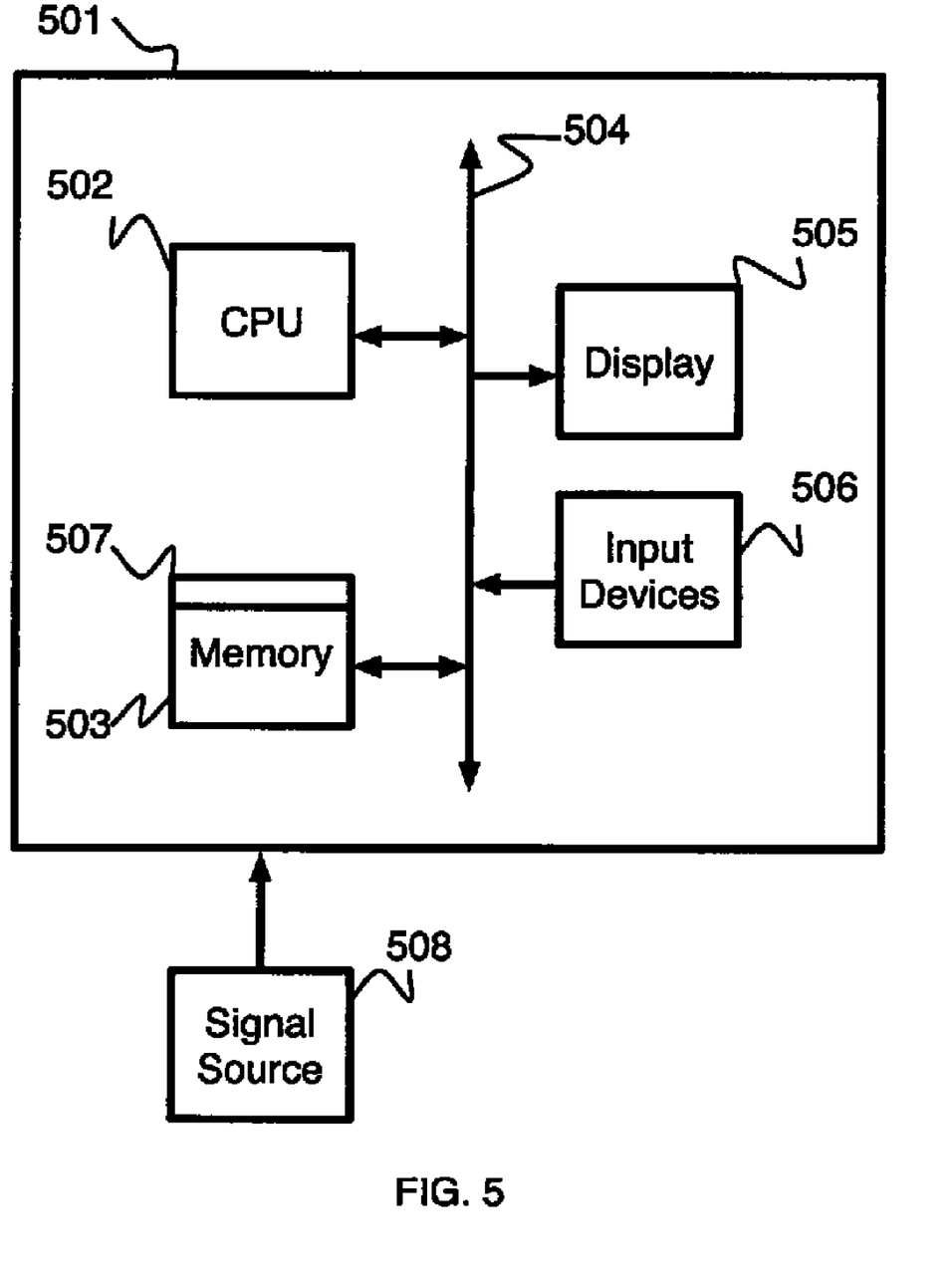
FIG. 5 is a computer system for determining and implementing a Mumford-Shah functional according to an embodiment of the present disclosure.

Referring now to FIG. 5, according to an embodiment of the present disclosure, a computer system (block 501) for machine learning, clustering and object segmentation within images includes, inter alia, a central processing unit (CPU) (block 502), a memory (block 503) and an input/output (I/O) interface (block 504). The computer system (block 501) is generally coupled through the I/O interface (block 504) to a display (block 505) and various input devices (block 506) such as a mouse and keyboard. The support circuits can include circuits such as cache, power supplies, clock circuits, and a communications bus. The memory (block 503) can include random access memory (RAM), read only memory (ROM), disk drive, tape drive, etc., or a combination thereof. The present invention can be implemented as a routine (block 507) that is stored in memory (block 503) and executed by the CPU (block 502) to process the signal from the signal source (block 508). As such, the computer system (block 501) is a general purpose computer system that becomes a specific purpose computer system when executing the routine (block 507) of the present disclosure.

The computer platform (block 501) also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for machine learning, clustering and object segmentation within images, it is noted that modifications and variations can be made by persons skilled in the art in light of the above teachings. It is therefore to be understood that changes may be made in embodiments of the present disclosure that are within the scope and spirit thereof.

What is claimed is:

1. A non-transitory computer readable medium embodying instructions executable by a processor to perform a method for recovering a contour using combinatorial optimization, the method steps comprising:
   receiving an input image;
   initializing functions for gradient f, smooth background g, and contour r;
   determining an optimum of the gradient f of a region R in the input image;
   extending the optimum of the gradient f of region R to a complement of R;
   determining an optimum of the smooth background function g for a region Q corresponding to the complement of R;
   extending the optimum of the smooth background function g of region Q to a complement of Q; and
   determining an optimum contour r according to the optimum of the gradient f and the optimum of the smooth background function g using combinatorial optimization.

2. The computer readable medium of claim 1, wherein the optimum contour r is a mesh smoothing segmentation of the input image.

3. The computer readable medium of claim 1, wherein the optimum contour r is a filtering of the input image.

4. The computer readable medium of claim 1, wherein the optimum contour r is a point clustering of the input image.

5. The computer readable medium of claim 1, wherein the input image is a non-uniformly sampled image.

6. A non-transitory computer readable medium embodying instructions executable by a processor to perform a method for recovering a contour using combinatorial optimization, the method steps comprising:
   receiving an input image comprising a plurality of pixels;
   initializing a segmentation model of the input image as a graph comprising a plurality of nodes, wherein each pixel of the image is associated with a respected node of the graph, and the segmentation model including functions for gradient smooth background g, and contour r;
   determining a foreground by the gradient f of a region R in the input image;
   extending the foreground of the gradient f of region R to a complement of R to determine an extended foreground;
   determining a background by the smooth background function g for a region Q corresponding to the complement of R;
   extending the background of the smooth background function g of region Q to a complement of Q to determine an extended background; and
   determining a contour r according to the extended foreground and the extended background, wherein the contour r is a segmentation of the input image.

7. The computer readable medium of claim 6, wherein the input image is two-dimensional.

8. The computer readable medium of claim 6, wherein the input image is three-dimensional.

9. The computer readable medium of claim 6, wherein extending the output of the gradient f includes a first set of the pixels of the input image outside of a foreground.

10. The computer readable medium of claim 6, wherein extending the output of the smooth background function g includes a second set of the pixels of the input image outside of a background.

11. The computer readable medium of claim 6, wherein the segmentation of the input image is a mesh smoothing segmentation.

12. The computer readable medium of claim 6, wherein the segmentation of the input image is a filter of the input image.

13. The computer readable medium of claim 6, wherein the segmentation of the input image is a point clustering.

14. The computer readable medium of claim 6, wherein the input image is a non-uniformly sampled image.

\* \* \* \* \*